(12) United States Patent
Kawachi et al.

(10) Patent No.: US 9,958,139 B2
(45) Date of Patent: May 1, 2018

(54) ILLUMINATION APPARATUS

(71) Applicant: PANASONIC INTELLECTUAL PROPERTY MANAGEMENT CO., LTD., Osaka (JP)

(72) Inventors: Hideharu Kawachi, Hyogo (JP); Yoshiyuki Nakano, Osaka (JP); Shinichi Kitaoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/450,639

(22) Filed: Mar. 6, 2017

(65) Prior Publication Data

US 2017/0254508 A1    Sep. 7, 2017

(30) Foreign Application Priority Data

Mar. 7, 2016  (JP) .................................. 2016-043838

(51) Int. Cl.
*F21V 7/04*     (2006.01)
*G02B 7/02*     (2006.01)
*G05D 25/00*    (2006.01)
*F21V 11/10*    (2006.01)
*F21V 29/503*   (2015.01)
(Continued)

(52) U.S. Cl.
CPC .............. *F21V 11/10* (2013.01); *F21K 9/61* (2016.08); *F21K 9/64* (2016.08); *F21V 5/04* (2013.01); *F21V 9/16* (2013.01); *F21V 15/015* (2013.01); *F21V 29/503* (2015.01);
(Continued)

(58) Field of Classification Search
CPC .......... F21V 11/10; F21V 29/503; F21V 5/04; F21V 9/16; F21V 15/015; F21K 9/61; F21K 9/64; G02B 6/0006; G02B 6/0008; F21W 2131/405; F21Y 2115/30
See application file for complete search history.

(56) References Cited

U.S. PATENT DOCUMENTS 6,340,246 B1 * 1/2002 Yoshida ............... G02B 6/3849
                                                 385/73
7,213,974 B2 * 5/2007 Kiani ....................... G02B 6/30
                                                  385/55
(Continued)

FOREIGN PATENT DOCUMENTS

JP   2003-295319   10/2003
JP   2012-74620    4/2012

*Primary Examiner* — Alexander Garlen
(74) *Attorney, Agent, or Firm* — Greenblum & Bernstein, P.L.C.

(57) ABSTRACT

An illumination apparatus which uses laser light emitted by a light source is provided. The illumination apparatus includes a housing which is tubular, internally includes an optical path for the laser light, and includes a first end surface having an opening through which the laser light passing through the optical path is released. A light emitter is opposed to the opening, receives the laser light released through the opening, converts the laser light into light having a different wavelength of a predetermined color, and emits the light. A cap is removably attached to a first end portion of the housing and through which the light emitted by the light emitter is released. A shutter opens the optical path when the cap is attached to the housing and closes the optical path when the cap is detached from the housing.

18 Claims, 8 Drawing Sheets

(51) Int. Cl.

| | |
|---|---|
| *F21K 9/61* | (2016.01) |
| *F21K 9/64* | (2016.01) |
| *F21V 5/04* | (2006.01) |
| *F21V 9/16* | (2006.01) |
| *F21V 15/015* | (2006.01) |
| *F21V 8/00* | (2006.01) |
| *F21Y 115/30* | (2016.01) |
| *F21W 131/405* | (2006.01) |

(52) U.S. Cl.
CPC ......... *G02B 6/0006* (2013.01); *G02B 6/0008* (2013.01); *F21W 2131/405* (2013.01); *F21Y 2115/30* (2016.08)

(56) References Cited

U.S. PATENT DOCUMENTS

2012/0251050 A1\* 10/2012 Lin .................. G02B 6/3825
385/53
2014/0016345 A1\* 1/2014 Nishio ................ G01J 1/0271
362/552
2017/0146221 A1\* 5/2017 Zauritz .................. F21V 14/08

\* cited by examiner

ILLUMINATION APPARATUS

CROSS REFERENCE TO RELATED APPLICATION

This application claims the benefit of priority of Japanese Patent Application Number 2016-043838 filed on Mar. 7, 2016, the entire content of which is hereby incorporated by reference.

BACKGROUND

1. Technical Field

The present disclosure relates to an illumination apparatus which uses laser light emitted by a light source.

2. Description of the Related Art

An illumination apparatus is conventionally known which emits light by exciting a phosphor using laser light as excitation light, so that the phosphor converts the laser light into light of a desired color (see Japanese Unexamined Patent Application Publication No. 2003-295319, for example). With such an illumination apparatus, a light source of the laser light and the phosphor are housed in a housing.

SUMMARY

The housing is sometimes disassembled temporarily for maintenance, for example. If the light source is emitting light then, there is a risk that the eyes of the maintenance worker will be irradiated with the laser light.

In view of the above, an object of the present disclosure is to enhance the eye-safe function by preventing laser light from exiting even when the light source emits light at the time of disassembly.

An illumination apparatus according to an aspect of the present disclosure is an illumination apparatus which uses laser light emitted by a light source and includes: a housing which is tubular, internally includes an optical path for the laser light, and includes a first end surface having an opening through which the laser light passing through the optical path is released; a light emitter which is opposed to the opening, receives the laser light released through the opening, converts the laser light into light having a different wavelength of a predetermined color, and emits the light; a cap which is removably attached to a first end portion of the housing and through which the light emitted by the light emitter is released; and a shutter which opens the optical path when the cap is attached to the housing and closes the optical path when the cap is detached from the housing.

According to the present disclosure, it is possible to enhance the eye-safe function by preventing laser light from exiting even when the light source emits light at the time of disassembly.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF EMBODIMENT

Hereinafter, an illumination apparatus according to an embodiment of the present disclosure will be described with reference to the drawings. It should be noted that the embodiment described below is to show a specific example of the present disclosure. Therefore, the numerical values, shapes, materials, structural elements, and the arrangement and connection of the structural elements, etc., shown in the following embodiment are mere examples, and are therefore not intended to limit the present disclosure. As such, among the structural elements in the following embodiment, elements not recited in any one of the independent claims indicating the broadest inventive concepts will be described as arbitrary structural elements.

It should also be noted that each drawing is a schematic illustration and not necessarily a precise illustration. Furthermore, in the drawings, like reference signs are given to like structural elements.

Embodiment

Hereinafter, an embodiment will be described.

[Use of Illumination Apparatus]

First, a use of an illumination apparatus according to an embodiment will be described.

Figure 1:
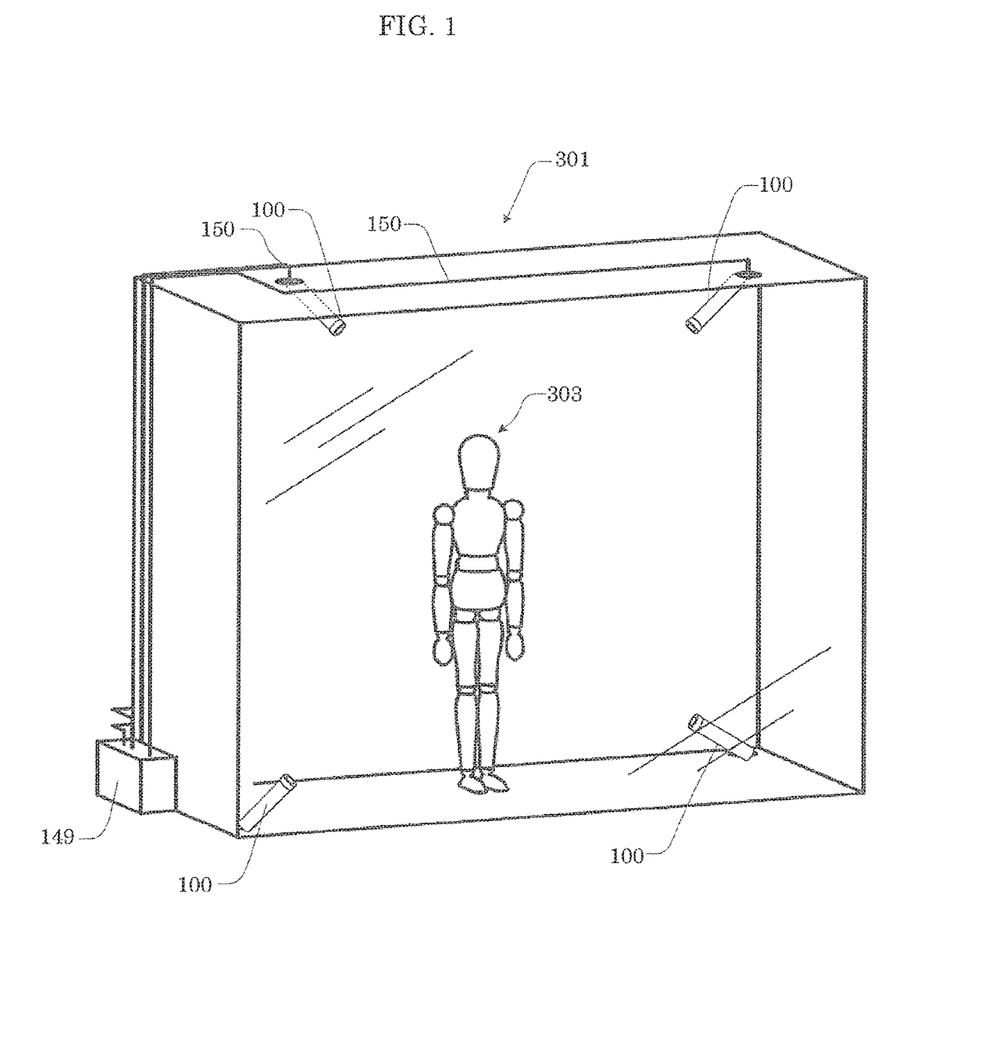
FIG. 1 is a perspective view illustrating a use of an illumination apparatus according to an embodiment.

FIG. 1 is a perspective view illustrating a use of an illumination apparatus according to an embodiment.

As illustrated in FIG. 1, a plurality of illumination apparatuses 100 are installed on the ceiling and the floor of shop window 301 which is an example of a building structure, and each illumination apparatus 100 functions as a spotlight to illuminate mannequin 303. Light source apparatus 149 is provided outside shop window 301. Laser light emitted by light source apparatus 149 is transmitted to each illumination apparatus 100 by optical fibers 150 which are wired outside shop window 301.

Light source apparatus 149 is a light source which generates laser light and supplies the laser light to the plurality of illumination apparatuses 100 through optical fibers 150. Specifically, light source apparatus 149 includes a plurality of semiconductor laser elements which emit laser light having a wavelength in a range from the wavelength of blue-violet light to the wavelength of blue light (i.e., 430 nm to 490 nm), for example. By disposing the semiconductor laser elements at one position, a cooling apparatus which cools the semiconductor laser elements can be centrally provided, thereby increasing the cooling efficiency and enabling use of exhaust heat and the like for heating water, for example.

Each illumination apparatus 100 emits white light using the laser light transmitted through optical fibers 150 as excitation light.

[Configuration of Illumination Apparatus]

Hereinafter, a configuration of illumination apparatus 100 will be described.

Figure 2:
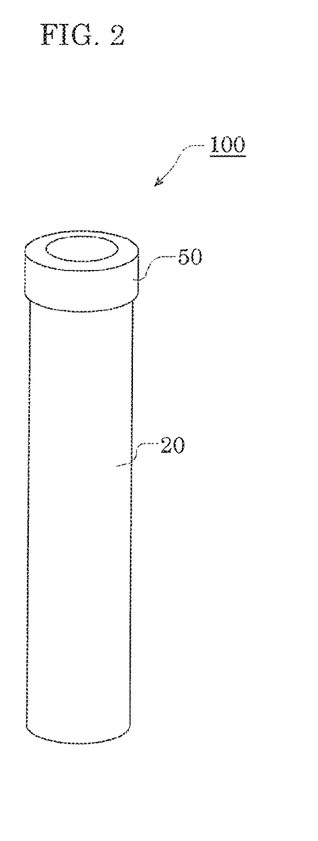
FIG. 2 is a perspective view illustrating a schematic configuration of an illumination apparatus according to an embodiment.
Figure 3:
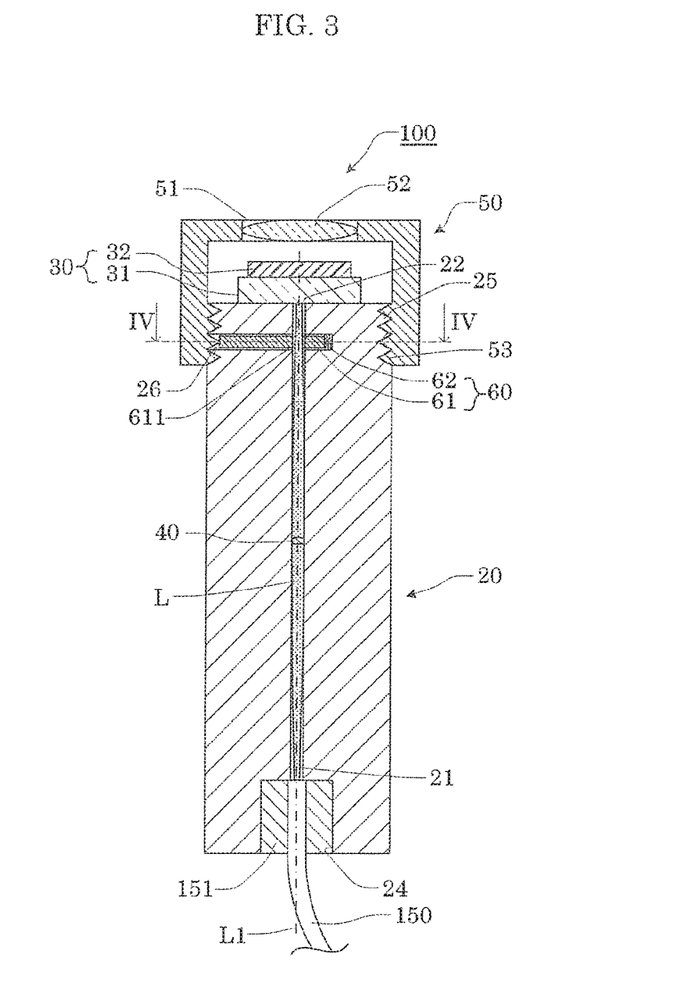
FIG. 3 is a cross section illustrating a schematic configuration of an illumination apparatus according to an embodiment.
Figure 4:
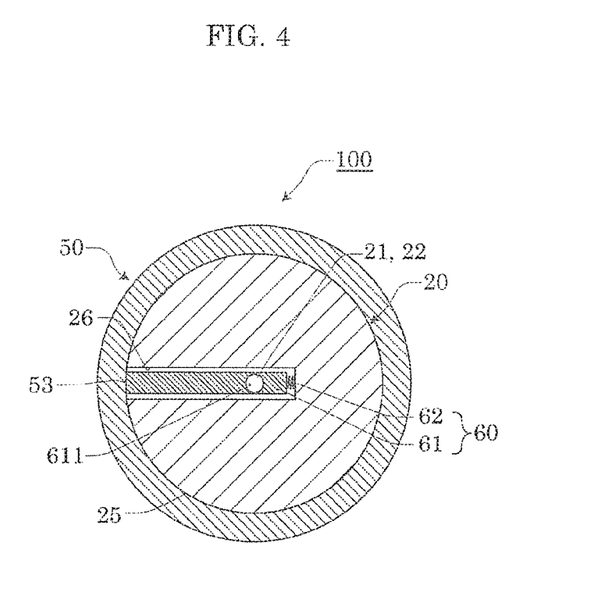
FIG. 4 is a cross section of an illumination apparatus according to an embodiment, cut along IV-IV line in FIG. 3.

FIG. 2 is a perspective view illustrating a schematic configuration of illumination apparatus 100 according to an embodiment. FIG. 3 is a cross section illustrating a schematic configuration of illumination apparatus 100 according to an embodiment. FIG. 4 is a cross section of illumination apparatus 100 according to an embodiment, cut along IV-IV line in FIG. 3.

As illustrated in FIG. 2 to FIG. 4, illumination apparatus 100 includes housing 20, light emitter 30, condenser lens 40, cap 50, and shutter 60.

[Housing]

Housing 20 is a tubular housing internally including optical path 21 of laser light L, and also includes, on a first end surface, opening 22 through which laser light L passing through optical path 21 is released. Specifically, the internal space of housing 20 is the optical path of laser light L. Although the present embodiment describes housing 20 having an elongated cylindrical external shape and a cylindrical internal space as an example, housing 20 may have any shape, so long as it is a tube with a hollow inside. Other possible shapes of housing 20 include a rectangular tube, for example. Housing 20 is formed using, for example, a metal having relatively high thermal conductivity, such as aluminum or copper.

Furthermore, a first end portion (upper end portion) of housing 20 is formed into male screw 25, and has hole 26 which opens a portion of the peripheral surface of male screw 25. Hole 26 is an elongated hole extending so as to be orthogonal to optical path 21, and has a first end portion exposed from the peripheral surface of male screw 25 and a second end portion located inside male screw 25. It should be noted that it is only necessary for hole 26 to intersect with optical path 21.

A second end surface of housing 20 has communicating opening 24 which allows communication between the outside and optical path 21. Ferrule 151 attached to a tip portion of optical fiber 150 is inserted into communicating opening 24. For example, ferrule 151 is a tubular component formed using a stainless steel, ceramics, a resin, or the like and is fit into communicating opening 24 to secure optical fiber 150 to housing 20.

Optical path 21 of laser light L is a cylindrical space, and condenser lens 40 is disposed on optical axis L1 of laser light L.

The first end surface of housing 20 has opening 22 through which laser light L is released outside. Opening 22 is formed into a circular shape when viewed along optical axis L1 of laser light L. It should be noted that viewing along optical axis L1 is hereinafter referred to as "optical-axis view."

[Light Emitter]

Light emitter 30 is an optical element which is opposed to opening 22, receives laser light L released through opening 22, converts laser light L into light having a different wavelength of a predetermined color, and emits the light. Light emitter 30 is disposed in contact with the first end surface of housing 20 so as to close opening 22. Examples of methods for fixing light emitter 30 to the first end surface of housing 20 include adhering light emitter 30 to the first end surface using an adhesive, and fixing light emitter 30 to the first end surface using a known fixing mechanism not illustrated.

Light emitter 30 includes substrate 31 and phosphor component 32.

Substrate 31 is a plate mounted on the first end surface of housing 20, with phosphor component 32 held on substrate 31. For example, substrate 31 is formed using a light-transmissive material such as glass or sapphire. Substrate 31 is formed into a rectangular plate shape. An example of substrate 31 is a plate which is square in the optical-axis view. Phosphor component 32 is stacked on the main surface of substrate 31 facing outside.

For example, phosphor component 32 includes phosphor particles which are dispersed and emit fluorescence when excited by laser light L, and the phosphors emit fluorescence by receiving laser light L. Thus, the main surface of phosphor component 32 facing outside is the light-emitting surface. Specifically, examples of phosphor component 32 include solidified phosphor particles and a base material such as a transparent resin or glass in which phosphor particles are dispersed. That is to say, phosphor component 32 can be said to be a wavelength conversion member which converts laser light into fluorescence. Phosphor component 32 is formed as a plate having a circular shape in the optical-axis view, and is stacked on substrate 31.

In the present embodiment, phosphor component 32 emits white light and includes the following two types of phosphors at an appropriate proportion: first phosphors which emit red light by receiving laser light L and second phosphors which emit green light by receiving laser light L.

Although the types and characteristics of the phosphors are not particularly limited, phosphors may have high heat resistance because relatively intense laser light is used as the excitation light. Although the type of the base material holding the phosphors in a dispersed manner is not particularly limited, the higher the transparency is, the better it is because a higher transparency increases the efficiency of white light emission. Furthermore, the higher the heat resistance of the base material is, the better it is because relatively intense laser light enters the base material.

Here, light emitter 30 may include: an optical system which changes the beam diameter of laser light L; a functional film for efficiently irradiating the phosphors with laser light; or scattering particles which cause light to scatter, for example.

[Condenser Lens]

Condenser lens 40 is a lens which is disposed in optical path 21 of housing 20 and condenses laser light L onto light emitter 30. Specifically, condenser lens 40 is disposed at a position at which the spot diameter of laser light L on light emitter 30 can be kept within a predetermined range. Here, the spot of laser light L on light emitter 30 is circular in the optical-axis view. Furthermore, condenser lens 40 is circular in the optical-axis view, that is, condenser lens 40 has the same shape as optical path 21 of housing 20.

Here, housing 20 includes a known holding mechanism (not illustrated) for holding condenser lens 40 at a predetermined position in optical path 21. Furthermore, although the present embodiment describes the exemplary case where laser light L is condensed by one condenser lens 40, laser light L may be condensed by a plurality of lenses.

[Cap]

Cap 50 is a component which is removably attached to the first end portion of housing 20 and through which light emitted by light emitter 30 is released. Cap 50 is formed using resin or metal, for example. In terms of the heat dissipating properties and the heat resisting properties, cap 50 may be formed using metal. Cap 50 is a bottomed tubular body having the upper portion as the bottom and the lower portion opened. Female screw 53 which is to be threadedly engaged with male screw 25 of housing 20 is formed on the inner peripheral surface of cap 50. When female screw 53 of cap 50 is threadedly engaged with male screw 25 of housing 20, cap 50 is attached to housing 20, whereas when female screw 53 of cap 50 is removed from male screw 25 of housing 20, cap 50 is detached from housing 20.

The bottom of cap 50 is opposed to phosphor component 32 of light emitter 30. Opening 51 is formed at the bottom of cap 50 for releasing light emitted from phosphor component 32. Optical member 52 which closes opening 51 is attached in opening 51 of cap 50. Optical member 52 is not particularly limited, so long as it transmits light emitted from phosphor component 32. For example, a light-transmissive member, a light-diffusing member, or a light-condensing member may be used as optical member 52. It should be noted that entire cap 50 may be integrally molded using one of these types of member.

[Shutter]

Figure 5:
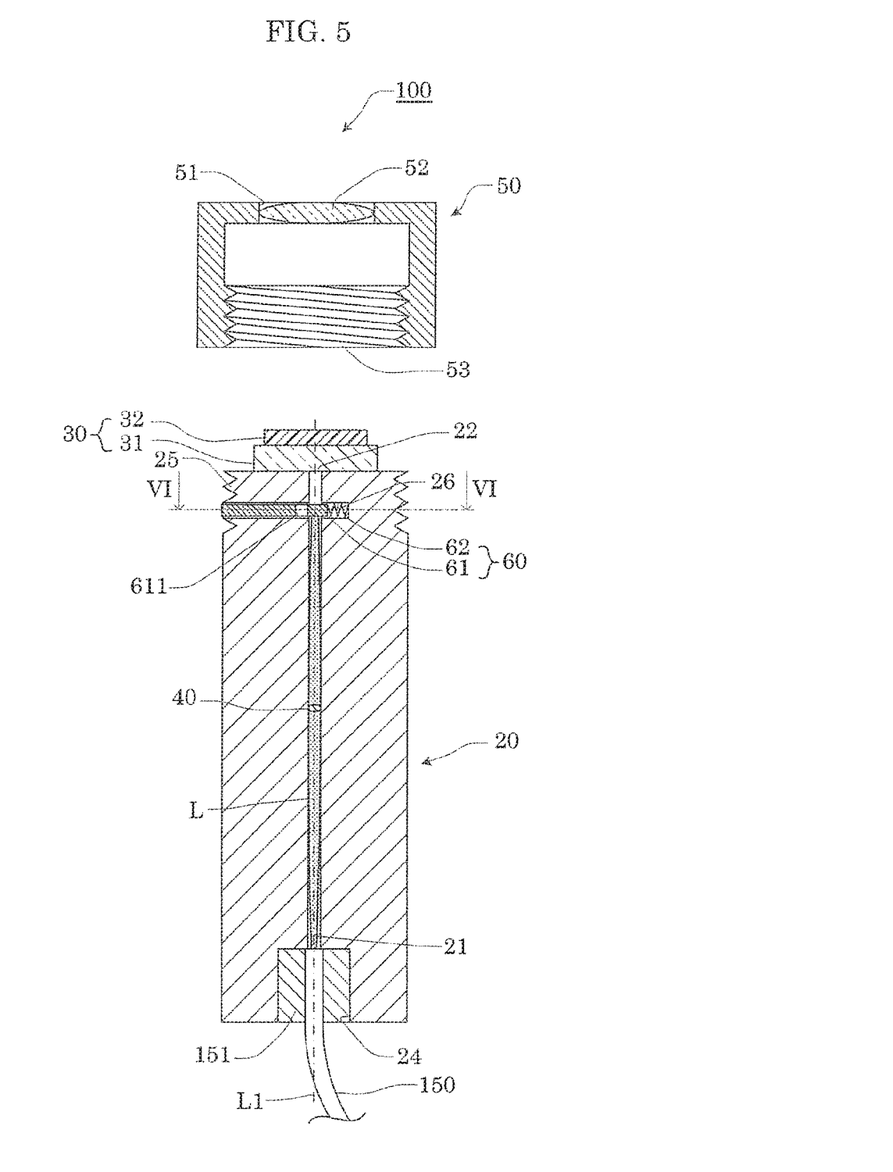
FIG. 5 is a cross section illustrating a schematic configuration of an illumination apparatus according to an embodiment.
Figure 6:
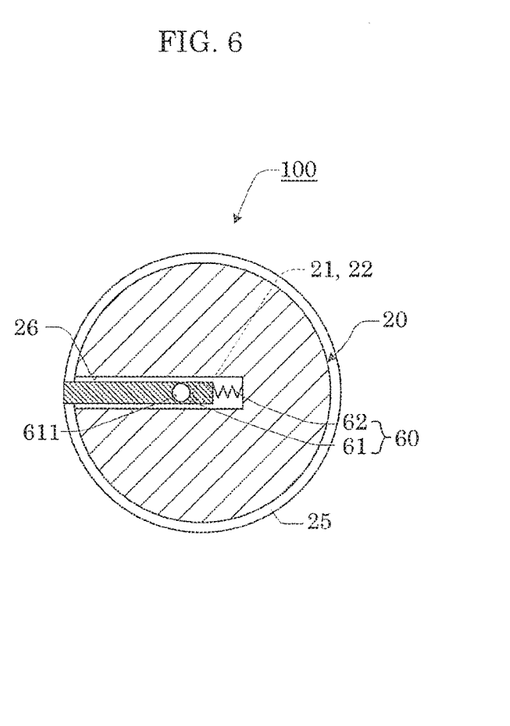
FIG. 6 is a cross section of an illumination apparatus according to an embodiment, cut along VI-VI line in FIG. 5.

FIG. 5 is a cross section illustrating a schematic configuration of illumination apparatus 100 according to an embodiment. FIG. 5 corresponds to FIG. 3. FIG. 6 is a cross section of illumination apparatus 100 according to an embodiment, cut along VI-VI line in FIG. 5. FIG. 6 corresponds to FIG. 4.

It should be noted that while FIG. 3 and FIG. 4 illustrate a state in which optical path 21 is opened by shutter 60, FIG. 5 and FIG. 6 illustrate a state in which optical path 21 is closed by shutter 60.

As illustrated in FIG. 3 to FIG. 6, shutter 60 is a mechanical portion which opens optical path 21 when cap 50 is attached to housing 20 and closes optical path 21 when cap 50 is detached from housing 20. Specifically, shutter 60 includes shutter member 61 and biasing member 62.

Shutter member 61 is an elongated bar-shaped member, and is formed using, for example, metal or resin having light-shielding properties. Shutter member 61 is housed inside hole 26 of housing 20 so as to intersect with optical path 21. A first end portion of shutter member 61 has through-hole 611 for opening optical path 21 of housing 20. A position of shutter member 61 including through-hole 611 in communication with optical path 21 so as to open optical path 21 is referred to as an "open position" (see FIG. 3 and FIG. 4). Furthermore, a position to which shutter member 61 moves from the open position so as to close entire optical path 21 is referred to as a "closed position" (see FIG. 5 and FIG. 6). Shutter member 61 can freely move between the open position and the closed position. When shutter member 61 is at the closed position, a second end portion of shutter member 61 protrudes from hole 26. The second end portion of shutter member 61 is pushed into hole 26 by female screw 53 of cap 50 when cap 50 is attached to housing 20. With this, shutter member 61 moves to the open position. The height (engaging height) of the thread of male screw 25 may be set to a value which allows shutter member 61 at the closed position to move to the open position.

Biasing member 62 is an elastic body, such as a spring or a rubber, which biases shutter member 61 in a predetermined direction. It should be noted that a spring is illustrated in the drawings as an example of biasing member 62. Biasing member 62 is fixed to a first end surface of hole 26 and a first end surface of shutter member 61 while being interposed between the first end surface of hole 26 and the first end surface of shutter member 61. When shutter member 61 is at the open position as cap 50 is attached to housing 20, biasing member 62 is compressed by shutter member 61. That is to say, shutter member 61 at the open position is biased by compressed biasing member 62 in a direction in which shutter member 61 comes off from hole 26, in other words, in a direction away from the open position. When cap 50 is detached from housing 20, biasing member 62 moves shutter member 61 from the open position, and thus through-hole 611 is disconnected from optical path 21 and shutter member 61 closes optical path 21.

[Operation of Illumination Apparatus]

Next, an operation of illumination apparatus 100 will be described.

At normal times, cap 50 is attached to housing 20 and shutter member 61 is located at the open position as illustrated in FIG. 3 and FIG. 4.

Laser light L with which optical path 21 of housing 20 is irradiated by optical fiber 150 is condensed onto substrate 31 of light emitter 30 by condenser lens 40. Laser light L entering phosphor component 32 via substrate 31 is converted into white light by phosphor component 32 and is released outside cap 50 from optical member 52.

In contrast, at the time of maintenance, cap 50 is detached from housing 20 for disassembly as illustrated in FIG. 5 and FIG. 6. With this, shutter member 61 is released from restriction placed by female screw 53 of cap 50, thereby moving from the open position to the closed position due to the bias from biasing member 62. Consequently, optical path 21 is closed by shutter member 61 and laser light L does not travel any further. That is to say, even if laser light L is being output from light source apparatus 149 at the time of removing light emitter 30 from housing 20 for replacement, for example, shutter member 61 prevents laser light L from exiting from housing 20.

Advantageous Effects, Etc.

As described above, according to the present embodiment, illumination apparatus 100 which uses laser light L emitted by a light source includes housing 20 which is tubular, internally includes optical path 21 for laser light L, and includes a first end surface having opening 22 through which laser light L passing through optical path 21 is released. Illumination apparatus 100 also includes light emitter 30 which is opposed to opening 22, receives laser light L released through opening 22, converts laser light L into light having a different wavelength of a predetermined color, and emits the light. Illumination apparatus 100 also includes cap 50 which is removably attached to a first end portion of housing 20 and through which the light emitted by light emitter 30 is released. Illumination apparatus 100 also includes shutter 60 which opens optical path 21 when cap 50 is attached to housing 20 and closes optical path 21 when cap 50 is detached from housing 20.

According to this configuration, shutter 60 closes optical path 21 when cap 50 is detached from housing 20. With this, shutter 60 blocks further traveling of the laser light even when illumination apparatus 100 is disassembled and cap 50 is detached from housing 20 for maintenance. Therefore, laser light L does not exit from illumination apparatus 100 even if the light source emits light at the time of disassembly. It is thus possible to enhance the eye-safe function.

Housing 20 includes hole 26 extending so as to intersect with optical path 21. Shutter 60 includes shutter member 61 disposed in hole 26, and shutter member 61 has through-hole 611. Shutter member 61 is movable between an open position and a closed position. Here, the open position includes through-hole 611 in communication with optical path 21 so as to open optical path 21, and the closed position includes through-hole 611 disconnected from optical path 21 so as to close optical path 21.

According to this configuration, since shutter member 61 is movable between the open position and the closed position, optical path 21 can be easily opened and closed by moving shutter member 61.

Shutter 60 further includes biasing member 62 which biases shutter member 61 in a predetermined direction. Shutter member 61 is located at the open position by being pushed into hole 26 by cap 50 when cap 50 is attached to the first end portion of housing 20, whereas biasing member 62 moves shutter member 61 from the open position to the closed position when cap 50 is detached from the first end portion of housing 20.

According to this configuration, since optical path 21 is closed by moving shutter member 61 from the open position using the bias of biasing member 62 at the time of detaching cap 50 from housing 20, it is possible to open and close optical path 21 with shutter member 61 by attaching and detaching cap 50, respectively.

The first end portion of housing 20 is formed into male screw 25, and cap 50 includes female screw 53 to be threadedly engaged with male screw 25. A first end portion of hole 26 is exposed from a portion of a peripheral surface of male screw 25. Female screw 53 moves shutter member 61 to the open position by pushing shutter member 61 in hole 26 when threadedly engaged with male screw 25.

According to this configuration, since cap 50 is attached to housing 20 by threaded engagement of male screw 25 and female screw 53, it is possible to firmly assemble cap 50 and housing 20. Furthermore, since recesses and a projection of female screw 53 are used to push shutter member 61 into hole 26 so that shutter member 61 moves to the open position, a separate structure dedicated for moving shutter member 61 is unnecessary. It is therefore possible to reduce complication of illumination apparatus 100.

[Variation]

Next, a variation according to the present embodiment will be described.

Figure 7:
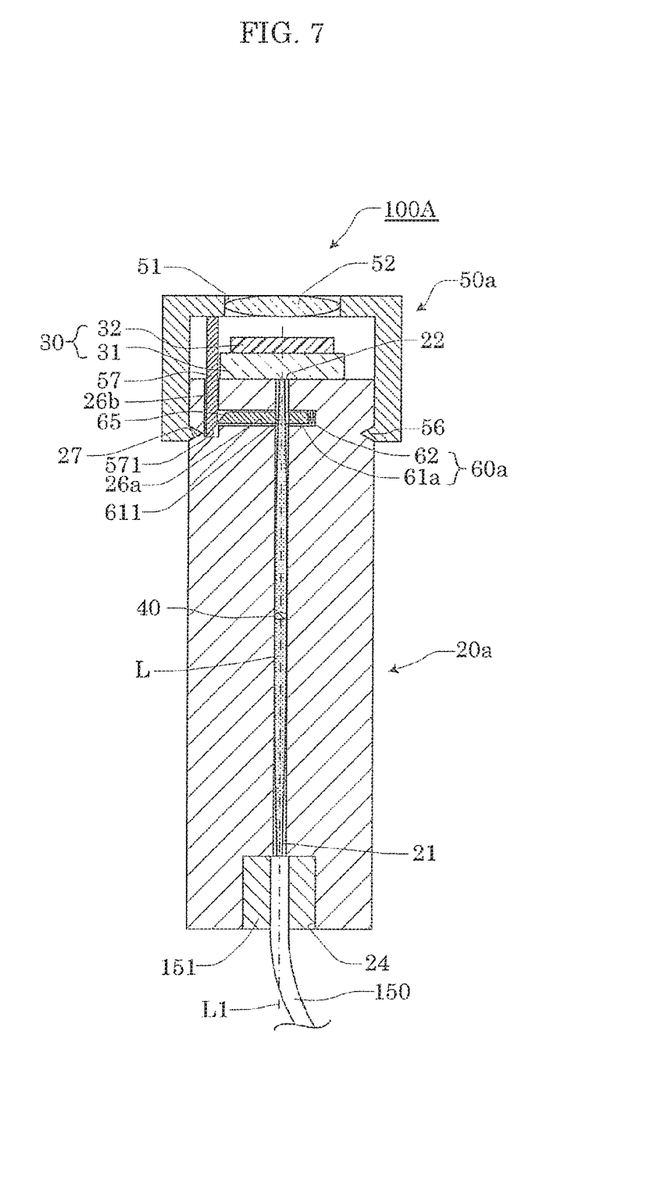
FIG. 7 is a cross section illustrating a schematic configuration of an illumination apparatus according to a variation.
Figure 8:
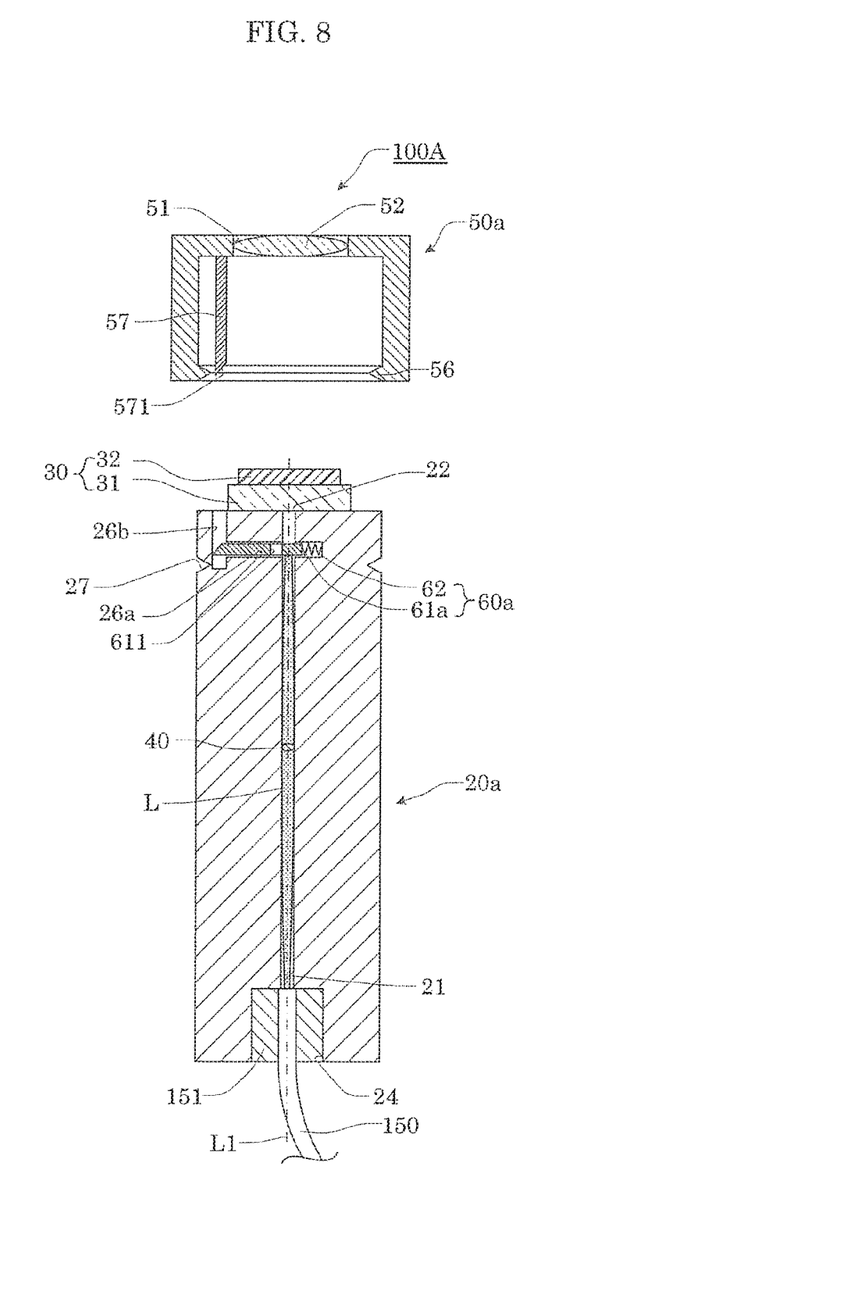
FIG. 8 is a cross section illustrating a schematic configuration of an illumination apparatus according to a variation.

FIG. 7 is a cross section illustrating a schematic configuration of illumination apparatus 100A according to a variation. FIG. 7 corresponds specifically to FIG. 3. FIG. 8 is a cross section illustrating a schematic configuration of illumination apparatus 100A according to a variation. FIG. 8 corresponds specifically to FIG. 5.

It should be noted that in the variation, elements identical to the elements of illumination apparatus 100 according to the above embodiment are given the same reference signs and overlapping descriptions thereof will be omitted, and only the different elements will be described.

As illustrated in FIG. 7 and FIG. 8, notch 27 is formed at a first end portion of housing 20a of illumination apparatus 100A, along the entire perimeter of housing 20a. Notch 27 is a portion used for engaging cap 50a.

Furthermore, first hole 26a and second hole 26b are formed at the first end portion of housing 20a. First hole 26a is an elongated hole extending so as to intersect with optical path 21. Shutter member 61a and biasing member 62 of shutter 60a are disposed in first hole 26a. Here, the second end portion of shutter member 61a has inclined surface 65 which becomes lower in height toward a second end.

Second hole 26b is an elongated hole extending from the first end surface of housing 20, in parallel to optical path 21. When biasing member 62 is in a stretched state, shutter member 61a is in such a position that inclined surface 65 is located inside second hole 26b (see FIG. 8). This position is the closed position of shutter member 61a.

The inner peripheral surface of cap 50a has projection 56 which engages with notch 27 of housing 20a when cap 50a is attached to housing 20a. Furthermore, rib 57 is provided in a standing manner on the inner bottom surface of cap 50a. A tip portion of rib 57 has inclined surface 571 which inclines outwardly as inclined surface 571 extends towards the tip. Rib 57 enters second hole 26b when cap 50a is attached to housing 20a. At this time, inclined surface 571 of rib 57 abuts inclined surface 65 of shutter member 61a and pushes shutter member 61a into first hole 26a. With this, shutter member 61a is located at the open position, and it becomes possible to release the light emitted by light emitter 30 (see FIG. 7).

Other Embodiments

Although an illumination apparatus according to the present disclosure has been described based on the above embodiment and variation, the present disclosure is not limited to the above embodiment.

In the above embodiment, light source apparatus 149 including semiconductor laser elements is provided outside illumination apparatus 100, and laser light is transmitted to illumination apparatus 100 through optical fibers 150. However, the present disclosure is not limited to this. For example, illumination apparatus 100 may include, at the first end portion of housing 20, a semiconductor laser element which can emit laser light L having optical axis L1.

Furthermore, light emitter 30 may include a wide variety of optical systems such as an optical system which increases the beam diameter of laser light L. For example, illumination apparatus 100 may include, as an optical system, a reflective film for efficiently irradiating the phosphors with entering laser light. Or, illumination apparatus 100 may include, as an optical system, a light-transmissive cover which diffuses and releases light emitted by light emitter 30, for example.

Moreover, the above embodiment has described the exemplary case where shutter member 61 is located at the open position when biasing member 62 is compressed and altered in shape, and shutter member 61 is located at the closed position when biasing member 62 is elastically restored. However, these can be opposite: shutter member 61 may be located at the open position when biasing member 62 is elastically restored, and shutter member 61 may be located at the closed position when biasing member 62 is altered in shape.

Furthermore, although the above embodiment has described the exemplary case where light emitter 30 covers opening 22 of housing 20, it is only necessary for light emitter 30 to cover the portion of opening 22 where laser light L passes through. That is to say, it is only necessary for light emitter 30 to be opposed to opening 22 in a region in which light emitter 30 receives the entire spot diameter of laser light L. Furthermore, light emitter 30 may be attached to cap 50. In this case, light emitter 30 may be attached in place of optical member 52.

With the illumination apparatus according to the present disclosure, the first end portion of the housing includes first screw threads, the cap includes second screw threads configured to be threadedly engaged with the first screw threads, a first end portion of the hole is exposed from a portion of a peripheral surface of the first screw threads, and the second screw threads are configured to move the shutter member to the open position by pushing the shutter member in the hole when threadedly engaged with the first screw threads.

With the above illumination apparatus, the first end portion of the hole is exposed between a pair of the first screw threads, and one of the second screw threads is configured to be between the pair of the first screw threads to move the shutter member to the open position by pushing the shutter member in the hole when the second screw threads are threadedly engaged with the first screw threads.

With the above illumination apparatus, an inner surface of the cap is configured to be engaged with the first end portion of the housing when the cap is attached to the first end portion of the housing, the hole is exposed from a portion of a peripheral surface of the first end portion of the housing, and the inner surface of the cap is configured to move the shutter member to the open position by pushing the shutter member in the hole when the cap is attached to the first end portion of the housing.

With the above illumination apparatus, the biasing member is a spring or a rubber.

With the above illumination apparatus, the housing includes a second hole extending so as to intersect with the hole, and the cap includes a rib which is configured to be provided in the second hole for contacting and moving the shutter member to the open position when the cap is attached to the first end portion of the housing.

With the above illumination apparatus, the second hole extends from the first end surface of the housing.

With the above illumination apparatus, the rib is provided on an inner bottom surface of the cap.

With the above illumination apparatus, a tip portion of the rib includes an inclined surface, an end portion of the shutter member includes an inclined surface, and the inclined surface of the tip portion of the rib is configured to abut the inclined surface of the end portion of the shutter member when the cap is attached to the first end portion of the housing.

With the above illumination apparatus, the hole is orthogonal to the optical path.

With the above illumination apparatus, the hole extends through the optical path.

The above illumination apparatus further includes a condenser lens disposed in the optical path of the housing for condensing the laser light onto the light emitter, wherein the hole in the housing is between the condenser lens and the light emitter along an optical axis of the laser light.

With the above illumination apparatus, a bottom of the cap includes an opening for releasing the light emitted by the light emitter, and an optical member is attached to the cap in the opening.

With the above illumination apparatus, the light emitter includes a substrate and a phosphor component, the phosphor component emitting fluorescence when excited by the laser light, the housing is optically connected to an optical fiber which provides the laser light, and the illumination apparatus does not include the light source.

An illumination system according to an aspect of the present disclosure is an illumination system including: a light source configured to emit laser light; a plurality of illumination apparatuses which use the laser light emitted by the light source; and optical fibers configured to supply the laser light from the light source to the plurality of illumination apparatuses, wherein each of the plurality of illumination apparatuses includes: a housing which is tubular, internally includes an optical path for the laser light, and includes a first end surface having an opening through which the laser light passing through the optical path is released; a light emitter which is opposed to the opening, receives the laser light released through the opening, converts the laser light into light having a different wavelength of a predetermined color, and emits the light; a cap which is removably attached to a first end portion of the housing and through which the light emitted by the light emitter is released; and a shutter which opens the optical path when the cap is attached to the housing and closes the optical path when the cap is detached from the housing, the plurality of illumination apparatuses use the laser light to illuminate a predetermined area, and the light source is disposed separately of the plurality of illumination apparatuses and the predetermined area.

With the above illumination system, the housing includes a hole extending so as to intersect with the optical path, the shutter includes a shutter member disposed in the hole, the shutter member having a through-hole, and the shutter member is movable between an open position and a closed position, the open position including the through-hole in communication with the optical path so as to open the optical path, the closed position including the through-hole disconnected from the optical path so as to close the optical path.

The above illumination system further includes a cooler disposed separately of the predetermined area and configured to cool the light source.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination apparatus which uses laser light emitted by a light source, the illumination apparatus comprising:
   a housing which is tubular, internally includes an optical path for the laser light, and includes a first end surface having an opening through which the laser light passing through the optical path is released;
   a light emitter which is opposed to the opening, receives the laser light released through the opening, converts the laser light into light having a different wavelength of a predetermined color, and emits the light;
   a cap which is removably attached to a first end portion of the housing and through which the light emitted by the light emitter is released; and
   a shutter which opens the optical path when the cap is attached to the housing and closes the optical path when the cap is detached from the housing; wherein the housing includes a hole extending inwardly from a side surface so as to intersect with the optical path, the shutter includes a shutter member disposed in the hole, the shutter member having a through-hole, and the shutter member is movable between an open position and a closed position, the open position including the through-hole in communication with the optical path so as to open the optical path, the closed position including the through-hole disconnected from the optical path so as to close the optical path.

2. The illumination apparatus according to claim 1, wherein
   the shutter further includes a biasing member which biases the shutter member in a predetermined direction, the shutter member is configured to be located at the open position by being pushed into the hole by the cap when the cap is attached to the first end portion of the housing, and the biasing member is configured to move the shutter member from the open position to the closed position when the cap is detached from the first end portion of the housing.

3. The illumination apparatus according to claim 2, wherein the first end portion of the housing is formed into a male screw, the cap includes a female screw configured to be threadedly engaged with the male screw, a first end portion of the hole is exposed from a portion of a peripheral surface of the male screw, and the female screw is configured to move the shutter member to the open position by pushing the shutter member in the hole when threadedly engaged with the male screw.

4. The illumination apparatus according to claim 2, wherein the first end portion of the housing includes first screw threads, the cap includes second screw threads configured to be threadedly engaged with the first screw threads, a first end portion of the hole is exposed from a portion of a peripheral surface of the first screw threads, and the second screw threads are configured to move the shutter member to the open position by pushing the shutter member in the hole when threadedly engaged with the first screw threads.

5. The illumination apparatus according to claim 4, wherein the first end portion of the hole is exposed between a pair of the first screw threads, and one of the second screw threads is configured to be between the pair of the first screw threads to move the shutter member to the open position by pushing the shutter member in the hole when the second screw threads are threadedly engaged with the first screw threads.

6. The illumination apparatus according to claim 2, wherein an inner surface of the cap is configured to be engaged with the first end portion of the housing when the cap is attached to the first end portion of the housing, the hole is exposed from a portion of a peripheral surface of the first end portion of the housing, and the inner surface of the cap is configured to move the shutter member to the open position by pushing the shutter member in the hole when the cap is attached to the first end portion of the housing.

7. The illumination apparatus according to claim 2, wherein the biasing member is a spring or a rubber.

8. The illumination apparatus according to claim 2, wherein the housing includes a second hole extending so as to intersect with the hole, and the cap includes a rib which is configured to be provided in the second hole for contacting and moving the shutter member to the open position when the cap is attached to the first end portion of the housing.

9. The illumination apparatus according to claim 8, wherein the second hole extends from the first end surface of the housing.

10. The illumination apparatus according to claim 9, wherein the rib is provided on an inner bottom surface of the cap.

11. The illumination apparatus according to claim 10, wherein a tip portion of the rib includes an inclined surface, an end portion of the shutter member includes an inclined surface, and the inclined surface of the tip portion of the rib is configured to abut the inclined surface of the end portion of the shutter member when the cap is attached to the first end portion of the housing.

12. The illumination apparatus according to claim 1, wherein the hole is orthogonal to the optical path.

13. The illumination apparatus according to claim 12, wherein the hole extends through the optical path.

14. The illumination apparatus according to claim 1, further comprising a condenser lens disposed in the optical path of the housing for condensing the laser light onto the light emitter, wherein the hole in the housing is between the condenser lens and the light emitter along an optical axis of the laser light.

15. The illumination apparatus according to claim 1, wherein a bottom of the cap includes an opening for releasing the light emitted by the light emitter, and an optical member is attached to the cap in the opening.

16. The illumination apparatus according to claim 1, wherein the light emitter includes a substrate and a phosphor component, the phosphor component emitting fluorescence when excited by the laser light, the housing is optically connected to an optical fiber which provides the laser light, and the illumination apparatus does not include the light source.

17. An illumination system, comprising:

a light source configured to emit laser light;

a plurality of illumination apparatuses which use the laser light emitted by the light source; and optical fibers configured to supply the laser light from the light source to the plurality of illumination apparatuses, wherein each of the plurality of illumination apparatuses includes:

a housing which is tubular, internally includes an optical path for the laser light, and includes a first end surface having an opening through which the laser light passing through the optical path is released;

a light emitter which is opposed to the opening, receives the laser light released through the opening, converts the laser light into light having a different wavelength of a predetermined color, and emits the light;

a cap which is removably attached to a first end portion of the housing and through which the light emitted by the light emitter is released; and a shutter which opens the optical path when the cap is attached to the housing and closes the optical path when the cap is detached from the housing, the plurality of illumination apparatuses use the laser light to illuminate a predetermined area, and the light source is disposed separately of the plurality of illumination apparatuses and the predetermined area; wherein the housing includes a hole extending inwardly from a side surface so as to intersect with the optical path, the shutter includes a shutter member disposed in the hole, the shutter member having a through-hole, and the shutter member is movable between an open position and a closed position, the open position including the through-hole in communication with the optical path so as to open the optical path, the closed position including the through-hole disconnected from the optical path so as to close the optical path.

18. The illumination system according to claim 17, further comprising a cooler disposed separately of the predetermined area and configured to cool the light source.

\* \* \* \* \*